United States Patent
Carmona et al.

(10) Patent No.: US 7,676,842 B2
(45) Date of Patent: Mar. 9, 2010

(54) SYSTEM AND METHOD FOR DETECTING MALICIOUS CODE

(75) Inventors: Itshak Carmona, Petach-Tikva (IL); Taras Malivanchuk, Holon (IL)

(73) Assignee: Computer Associates Think, Inc., Islandia, NY (US)

( * ) Notice: Subject to any disclaimer, the term of this patent is extended or adjusted under 35 U.S.C. 154(b) by 1298 days.

(21) Appl. No.: 10/410,974

(22) Filed: Apr. 10, 2003

(65) Prior Publication Data

US 2003/0217286 A1 Nov. 20, 2003

Related U.S. Application Data

(60) Provisional application No. 60/372,283, filed on Apr. 13, 2002, provisional application No. 60/372,473, filed on Apr. 15, 2002.

(51) Int. Cl.
*G06F 12/14* (2006.01)

(52) U.S. Cl. .................. 726/24; 726/22; 713/187; 713/188

(58) Field of Classification Search .......... 713/187, 713/188; 380/4; 726/24
See application file for complete search history.

(56) References Cited

U.S. PATENT DOCUMENTS

| 5,454,000 | A |   | 9/1995 | Dorfman |         |
| 5,509,120 | A | * | 4/1996 | Merkin et al. | 726/24 |
| 5,684,875 | A | * | 11/1997 | Ellenberger | 482/4 |
| 5,842,002 | A | * | 11/1998 | Schnurer et al. | 703/21 |
| 6,021,510 | A | * | 2/2000 | Nachenberg | 714/38 |
| 6,577,920 | B1 | * | 6/2003 | Hypponen et al. | 700/200 |
| 6,922,781 | B1 | * | 7/2005 | Shuster | 713/165 |
| 7,131,036 | B2 | * | 10/2006 | Wray et al. | 714/38 |
| 7,143,113 | B2 | * | 11/2006 | Radatti | 707/200 |
| 7,231,440 | B1 | * | 6/2007 | Kouznetsov et al. | 709/224 |
| 2001/0005889 | A1 | * | 6/2001 | Albrecht | 713/201 |
| 2003/0023865 | A1 | * | 1/2003 | Cowie et al. | 713/200 |
| 2003/0115485 | A1 | * | 6/2003 | Milliken | 713/201 |
| 2004/0236884 | A1 | * | 11/2004 | Beetz | 710/68 |

FOREIGN PATENT DOCUMENTS

| EP | 1043659 | 10/2000 |
| WO | WO0028420 | 5/2000 |

OTHER PUBLICATIONS

The Patent Office of the People's Republic of China, The First Office Action, for Application No. 03808365.5, 10 pages, Jun. 9, 2006.
Qiang; "Computer Programming Skill and Maintenance"; 1 page, 1999.

* cited by examiner

*Primary Examiner*—Kimyen Vu
*Assistant Examiner*—Edward Zee
(74) *Attorney, Agent, or Firm*—Baker Botts L.L.P.

(57) ABSTRACT

A method of detecting malicious code in computer readable code includes performing an initial determination to determine whether a first portion of the computer readable code may potentially have malicious code and if it is determined that the computer readable code potentially has malicious code, performing another determination to determine whether a second portion not including the first portion of the computer readable code has malicious code.

38 Claims, 4 Drawing Sheets

SYSTEM AND METHOD FOR DETECTING MALICIOUS CODE

REFERENCE TO RELATED APPLICATIONS

The present application claims the benefit of Provisional Application Ser. No. 60/372,283 filed Apr. 13, 2002 and Provisional Application Ser. No. 60/372,473 filed Apr. 15, 2002, the entire contents of both of which are herein incorporated by reference.

BACKGROUND OF THE DISCLOSURE

1. Field of the Disclosure

The present disclosure relates to a system and method for detecting malicious code.

2. Description of the Related Art

Each year, more and more computer viruses and variations of computer viruses are encountered. The required effort to maintain computer systems free from such viruses has increased dramatically. One way of attempting to keep a computer system free from viruses is to scan the system periodically to check for viruses. For optimum safety, the scans are usually performed at least once daily. However, with the increase in the number of computer viruses, the resulting increase in the time required to adequately scan a computer system can be burdensome.

Accordingly, a need exists for a system and method of decreasing the amount of time required to check a system for computer viruses.

SUMMARY OF THE DISCLOSURE

A method, computer recording medium and apparatus are disclosed for detecting malicious code in computer readable code. The method comprises performing an initial determination to determine whether a first portion of the computer readable code may potentially have malicious code and if it is determined that the computer readable code potentially has malicious code, performing another determination to determine whether a second portion not including the first portion of the computer readable code has malicious code.

A method, computer recording medium, and apparatus are also disclosed for detecting malicious code in computer readable code, the method comprising determining a (Cyclic Redundancy Check) CRC of a first portion of the computer readable code, performing an initial determination to determine whether the CRC of the first portion of the computer readable code is present in a database of CRCs, each CRC including corresponding instructions for how to proceed if the determined CRC is present in the database of CRCs and if it is determined that the CRC of the first portion of the computer readable code is present in the database of CRCs, performing the corresponding instructions.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
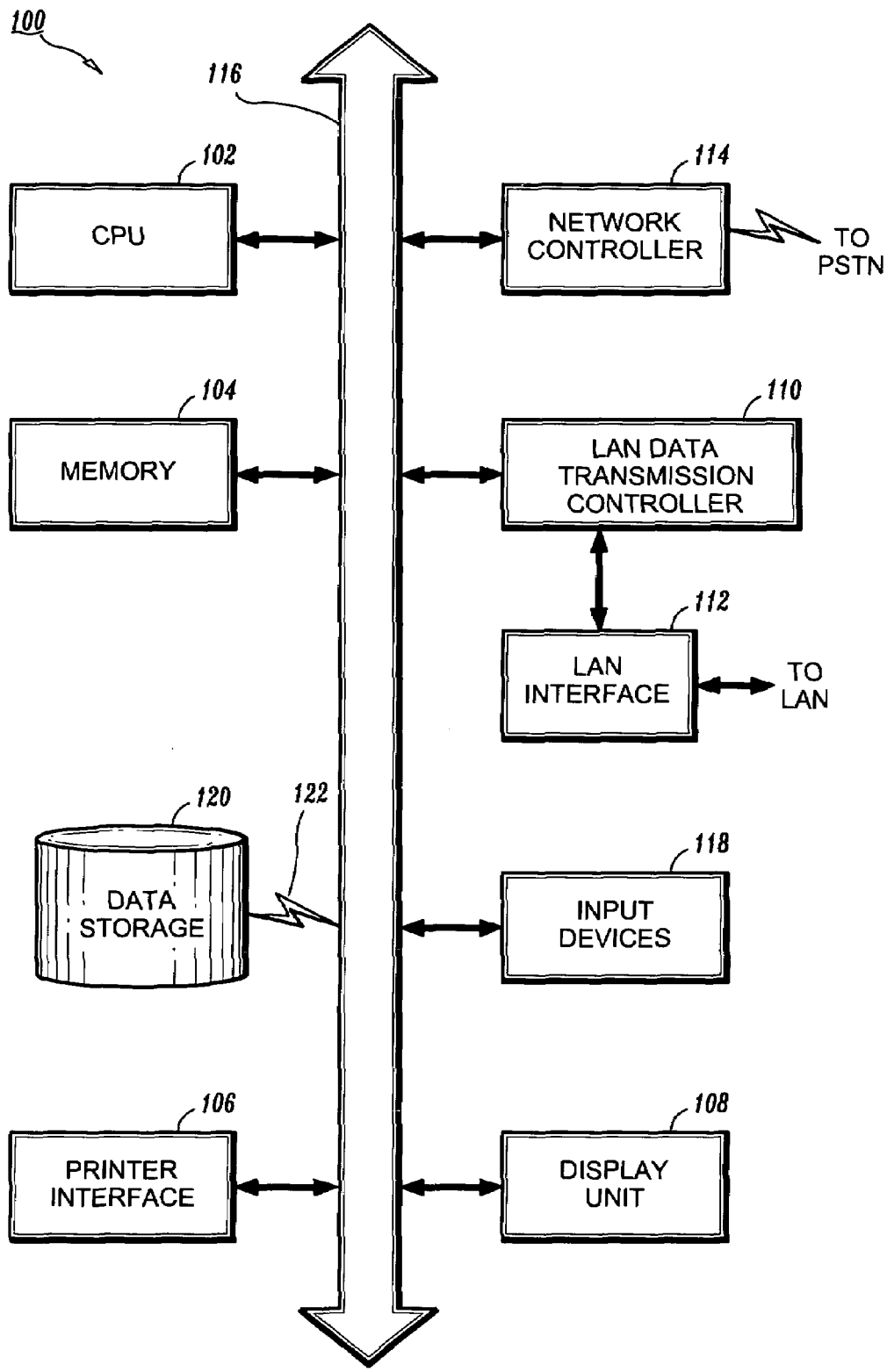
FIG. 1 is a block diagram of an example of a system to which the present disclosure may be applied.

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

FIG. 1 depicts an example of a computer system capable of implementing the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system is referred to generally as system 100, and may include a central processing unit (CPU) 102, memory 104, for example, Random Access Memory (RAM), a printer interface 106, a display unit 108, a (LAN) local area network data transmission controller 110, a LAN interface 112, a network controller 114, an internal bus 116 and one or more input devices 118, for example, a keyboard, mouse etc. As shown, the system 100 may be connected to a data storage device, for example, a hard disk, 120, via a link 122.

The data storage device might have stored therein numerous files of various types. Examples of the types of files that might be stored include batch files (BAT), executable command files (COM), and executable files (EXE), etc. Each type of file might have be vulnerable to corruption by one or more viruses. The present system is capable of performing a check (e.g., a cyclic redundancy check (CRC)) on a portion of each file to determine whether the file might be corrupt. If it is determined from this check that the file might be corrupt, a larger portion of the file can be examined to determine whether the file is actually corrupt.

Many types of files have one or more portions that are unique, for example, the header of an EXE file. Each EXE file has a header which is a 512 byte area located at the beginning of the file. Out of the 512 bytes, only 27 bytes usually contain header information. The header contains various types of information about the file itself which is used by the system when loading and executing the file. The header might include ID bytes, Total bytes on the last sector, total number of sectors, number of relocatable items, header size, minimum and maximum paragraphs required, etc. If the file is corrupted by a virus, it will likely be reflected in a change in at least some portion of the header.

An embodiment of the present system and method takes advantage of this by first obtaining the CRC of the header of a file and then comparing it to the CRCs of headers of files containing viruses (viral CRCs). If the CRCs match, this might indicate that the file contains the virus. Then, a more comprehensive check of the file can be performed to confirm that the file contains a virus. For example, a CRC of a larger portion (or all) of the file can be determined. This CRC can then be compared with the CRC of a larger portion (or all) of the file containing the virus. If these CRCs match, the file is corrupt and the user can be notified. The larger portion of the file may be the entire file or only a portion of the file that remains constant and does not normally vary.

Figure 2:
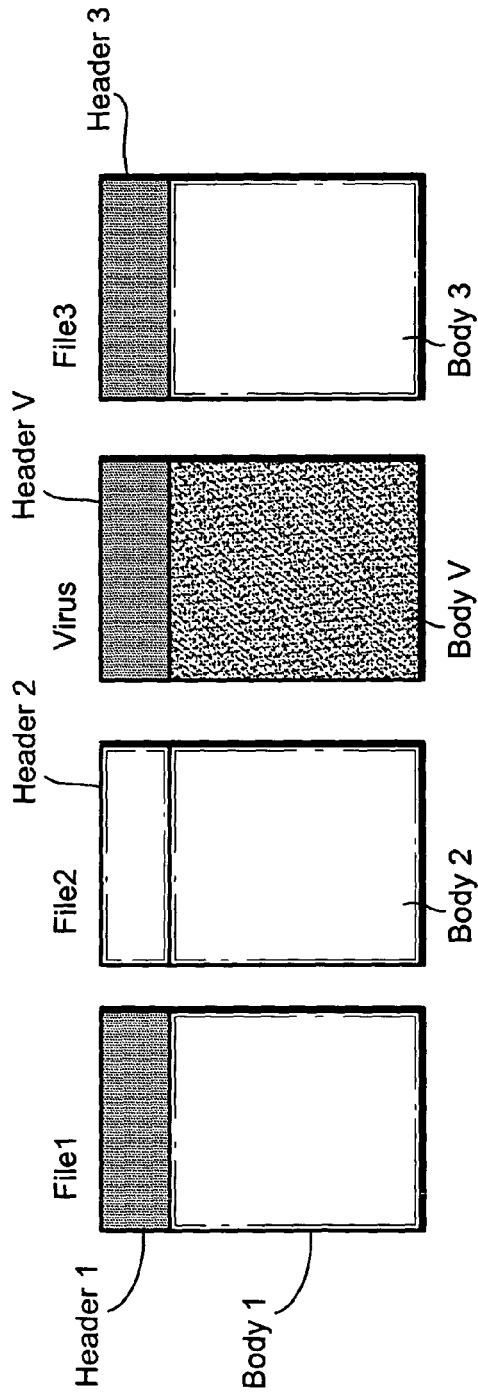
FIG. 2 is a diagram showing various portions of files.

As shown in FIG. 2, the system might include three files, File1, File2 and File3. Each file includes a header portion labeled Header1, Header2 and Header3, respectively and a body portion labeled Body1, Body2 and Body3, respectively. The file labeled Virus is a file infected with a known virus. The Virus file also includes a header portion labeled HeaderV and a body portion labeled BodyV. Although the entire Virus file might be stored on the system, it is not necessary to do so. That is, instead of storing the entire Virus file, only the CRCs of one or more portions of the Virus file can be determined and stored. For example, the CRC of the header (HeaderV) of the Virus file can be determined and stored in memory along with the CRC of the body (BodyV) of the Virus file. Although only one virus file is shown, it will be appreciated that an actuality, many Virus files are used and one or more CRCs are determined for each.

During a virus scan, instead of scanning the entire contents of each of the files (File1, File2 and File3), only the headers are scanned so that the CRCs of the headers of each of files File1, File2 and File3 can be determined. These CRCs are then compared with the CRCs of the headers of the Virus files. For example, if a CRC of the header of File1 matches the CRC of the header of the Virus file, this triggers a further scan of File1. The CRC of the body (Body1), for example, of File1 is then determined. This CRC is then compared with the CRC of the body (BodyV) of the Virus file. If the CRCs match, this indicates that the file is infected. The user can then be notified and/or the system can attempt to remove the virus.

Figure 3:
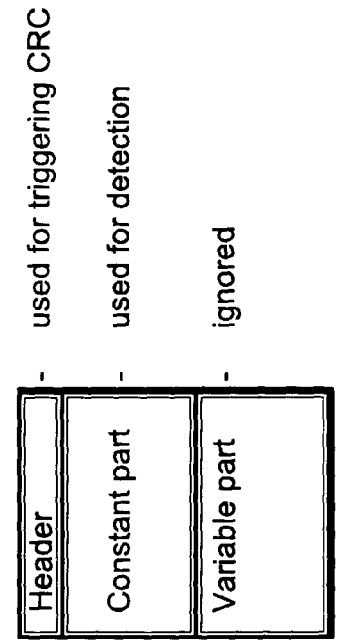
FIG. 3 is a diagram showing other portions of files.

When the CRC of the body of a file is determined, the entire file might be scanned or all or one or more portions of the body might be scanned. The CRC of the body of the file my include a scanning of the header as well. For example, as shown in FIG. 3, a file might include a Header, a Constant portion and a Variable portion. For files that change often, it may be desirable to determine the CRCs of the files without scanning the Variable portion(s) of the file. In this case, the CRCs can be determined by scanning only the Constant portions or the Constant portions and the Header portions of the files.

According to an embodiment of the present disclosure, known virus information is stored in memory. The memory may be system memory 104 as shown in FIG. 1, or may be a removable storage media or a memory or database remotely accessible by computer system 100, via, for example, the Internet. The virus information includes sets of viral information, each including a first viral CRC and corresponding second viral CRC. Each first viral CRC can be determined by calculating the CRC of a portion or portions of files infected with viruses. For example, the first viral CRC can be determined by calculating the CRC of the headers of files infected with viruses. Each first firal CRC has at least one corresponding second viral CRC. The second viral CRC can be determined, for example, by calculating the CRC of the body of the file infected with the virus. The database might include numerous sets of viral information for detecting various types of viruses in various types of files.

Figure 4:
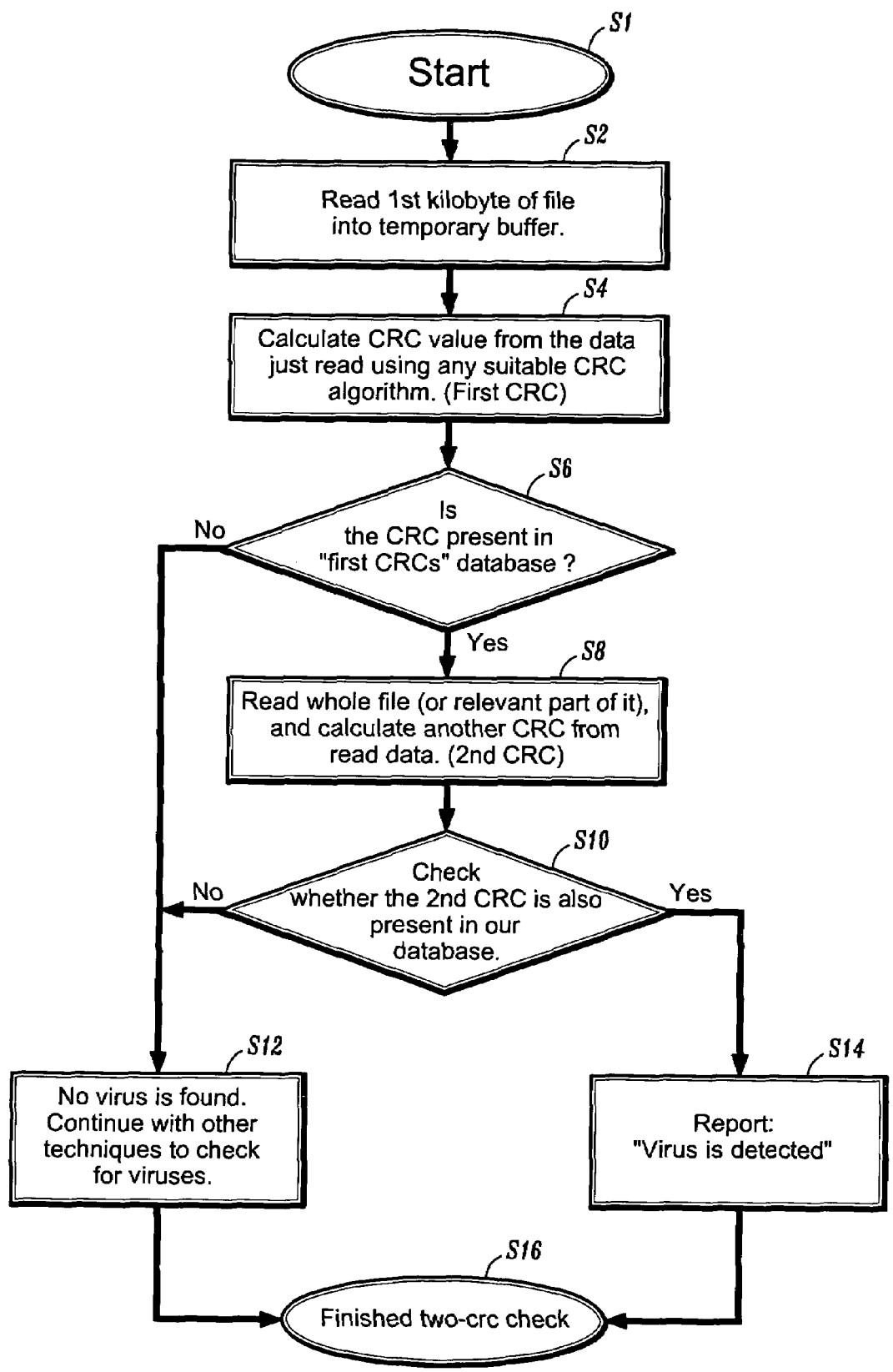
FIG. 4 is a flow chart for describing a system according to an embodiment of the present disclosure.

FIG. 4 depicts a flow diagram of a method of detecting malicious code according to an embodiment of the present disclosure. According to this embodiment, a database is provided which stores sets of viral information for various types of files infected with various types of viruses. Each set includes a first viral CRC and a second viral CRC. The first viral CRCs are determined by scanning the headers of files infected with viruses. The second viral CRCs are determined by scanning the constant portions (FIG. 3) of the infected files. The method may be implemented in the form of a computer executable code stored in computer system memory 100, for example, or stored remotely at a remote application service provider site which is accessible by computer system 100. After the system starts (Step S1), a portion (e.g., the first kilobyte (or the header)) of a file to be examined is read into a temporary buffer (Step S2). This might be performed in response to a specific request by the user to scan the file for viruses or in response to a set order in which the files are to be scanned for viruses. In Step S4, a CRC of the data read into the buffer is then determined (first CRC). The first CRC is then compared to the first viral CRCs stored in the database (Step S6). If the first CRC does not match any of the stored first viral CRCs (No, Step S6), it is determined that no virus is found and the system may continue with other techniques to check for viruses and/or inform the user that a virus was not found (Step S12). If the first CRC matches a first viral CRC (Yes, Step S6), the constant portion of the file is read into the temporary buffer, scanned and its second CRC is determined (Step S8). This second CRC is then compared with the corresponding second viral CRC (Step S10). If the second CRC matches the corresponding second viral CRC(Yes, Step S10), it is determined that the file contains the virus and appropriate action can be taken (Step S14). If the CRC of the body of the file does not match the CRC of the body of the virus of the infected file (No, Step S11), the process proceeds to Step S12 and appropriate action taken. The process then ends (Step S16).

According to another embodiment of the present disclosure, the viral CRCs are stored in the database with instructions indicating how to proceed when a CRC match occurs. This embodiment allows a great degree of flexibility when dealing with different types of viruses, since each viral CRC can include a different set of instructions for dealing with a match. For example, if a CRC of the file header matches a viral CRC in the database, the database might include instructions that the CRC of another portion of the file should then be calculated. For example, the instructions might indicate that the CRC of the next kilobyte of data should be calculated and again compared with the viral CRCs in the database. If that CRC again matches a viral CRC in the database, instructions stored in the database with the viral CRC might instruct the system to determine the CRC of another portion of the file and again compare it to the viral CRCs stored in the database, etc. Some viral CRCs might have instructions included therewith indicating that if a CRC matches it, the CRC of the entire file should be calculated and the resulting CRC compared with the viral CRCs in the database. Some viral CRCs might have instructions included therewith indicating that if a CRC matches it, the CRC of only a constant portion of the file should be calculated and the resulting CRC compared with the viral CRCs in the database. Some viral CRCs might have instructions included therewith indicating that if a CRC matches it, another form of virus detection should be performed on the file, instead of calculating another CRC on the file.

Figure 5:
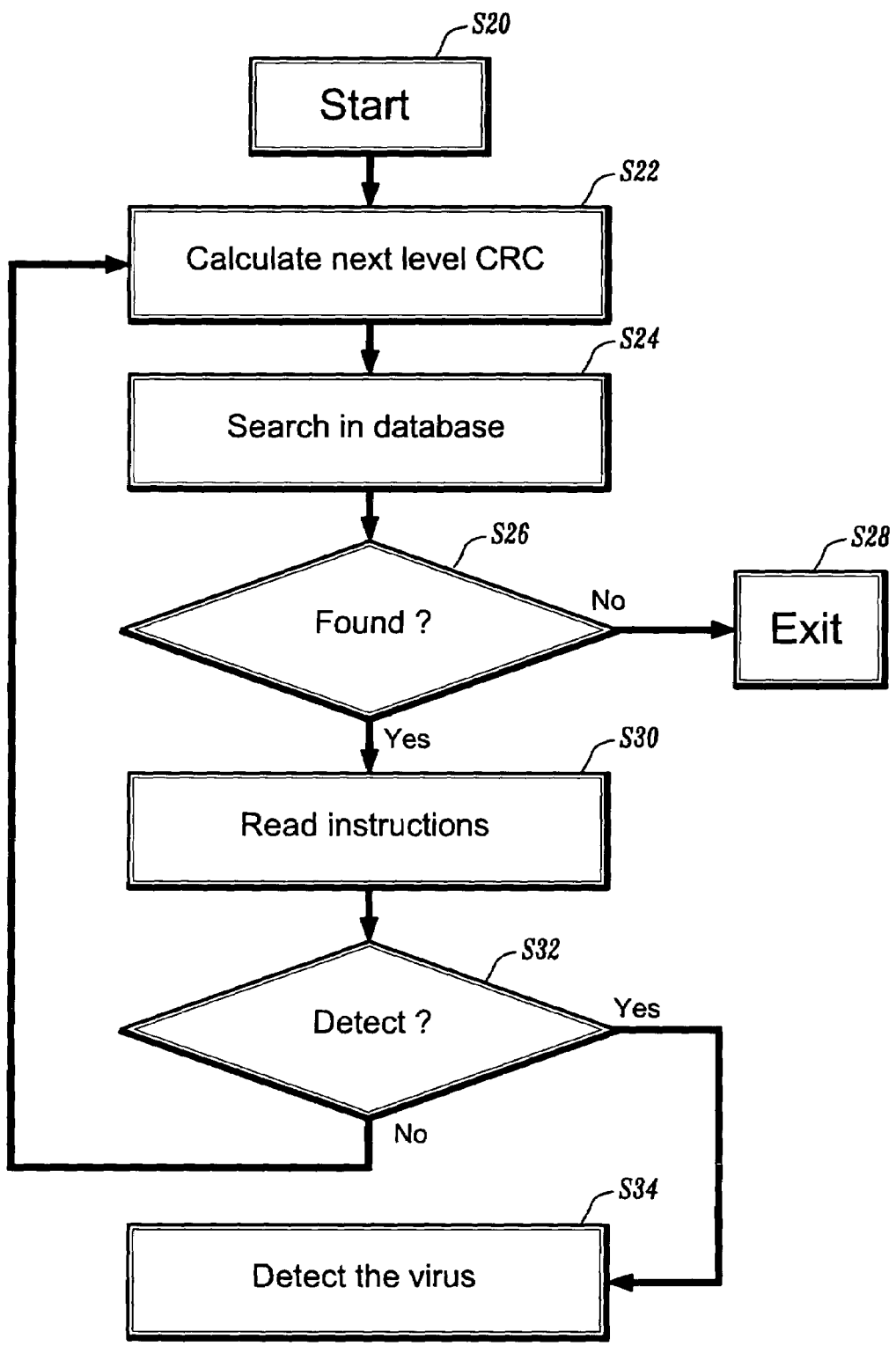
FIG. 5 is a flow chart for describing a system according an another embodiment of the present disclosure.

FIG. 5 is a flow chart for describing a process according to this embodiment of the present disclosure. After start of the system (Step S20), the system calculates the next level of CRC (Step S22). Initially, this step calculates the CRC of the first kilobyte (or header) of the file. The database of viral CRCs is then searched for a match (Step S24). If a matching viral CRC is not found (No, Step S26), the process ends (Step S28). Step S28 might direct the system to inform the user that the file was not viral and/or direct the system to perform another type of virus detection or proceed to the next file to be checked. If a matching viral CRC is found (Yes, Step S26), the instructions stored with the viral CRC are read and the instructions performed (Step S30). These instructions might direct that since the CRCs matched, the virus has been detected (Yes, Step S32) and this information can then be conveyed to the user via, for example, a display (Step S34), if desired. If the instructions direct that a CRC of another portion of the file or of the entire file be calculated (No, Step S32), the process returns to Step S22, where the next CRC can be calculated and the process repeated.

As noted above, the instructions might direct that another type of virus detection be performed. If the instructions direct that another form of virus detection be used, an attempt is made to detect the virus using the type of virus detection indicated in the instructions. If the virus is detected, the user can then be notified.

Although the above describes the use of CRCs, it will be appreciated that other methods might be used for determining the presence of possible viruses in the file. For example, signatures for the header and body portions of the files might be used instead of CRCs.

The present disclosure may be conveniently implemented using one or more conventional general purpose digital computers and/or servers programmed according to the teachings of the present disclosure. Appropriate software coding can readily be prepared by skilled programmers based on the teachings of the present disclosure. The present disclosure may also be implemented by the preparation of application specific integrated circuits or by interconnecting an appropriate network of conventional component circuits.

Numerous additional modifications and variations of the present disclosure are possible in view of the above-teachings. It is therefore to be understood that within the scope of the present disclosure, the present disclosure may be practiced other than as specifically described herein.

What is claimed is:

1. A method of detecting malicious code in computer readable code, comprising:
   determining a Cyclic Redundancy Check (CRC) value of a first portion of the computer readable code;
   performing an initial determination to determine whether the computer readable code potentially has malicious code by determining whether the CRC value of the first portion of the computer readable code is present in a database of first viral CRC values used for determining whether the computer readable code potentially has malicious code, each first viral CRC value including corresponding instructions specific to the each first viral CRC value for how to proceed if it is determined that the computer readable code potentially has malicious code; and
   if it is determined that the CRC value of the first portion of the computer readable code matches a first viral CRC value present in the database of first viral CRC values:
   determining another CRC value of another portion of the computer readable code as indicated by the corresponding instructions associated with the matching first viral CRC value; and
   determining whether the computer readable code has malicious code by determining whether the another CRC value is present in a database of second viral CRC values used for determining whether the computer readable code has malicious code, each second viral CRC value including corresponding instructions specific to the each second viral CRC value for how to proceed if it is determined that the computer readable code has malicious code.

2. A method as recited in claim 1, wherein the corresponding instructions associated with the matching first viral CRC value comprise virus-specific instructions indicating how to proceed when malicious code associated with a particular-type of virus is potentially detected.

3. The method of claim 1, wherein the corresponding instructions associated with the matching first viral CRC value comprise a course of action to be taken when it is determined that the CRC value of the first portion of the computer readable code matches a first viral CRC value present in the database of first viral CRC values.

4. The method of claim 1, wherein it is determined that the computer readable code has malicious code if the another CRC value matches a second viral CRC value in the database of second viral CRC values.

5. The method of claim 1, wherein the another portion comprises a constant portion of the computer readable code.

6. The method of claim 1, wherein the another portion is larger than the first portion.

7. A recording medium encoded with executable code for detecting malicious code in computer readable code, the executable code comprising:
   code configured to determine a Cyclic Redundancy Check (CRC) value of a first portion of the computer readable code;
   code configured to perform an initial determination to determine whether the computer readable code potentially has malicious code by determining whether the CRC value of the first portion of the computer readable code is present in a database of first viral CRC values used for determining whether the computer readable code potentially has malicious code, each first viral CRC value including corresponding instructions specific to the each first viral CRC value for how to proceed if it is determined that the computer readable code potentially has malicious code; and
   code configured to, if it is determined that the CRC value of the first portion of the computer readable code matches a first viral CRC value present in the database of first viral CRC values:
   determine another CRC value of another portion of the computer readable code as indicated by the corresponding instructions associated with the matching first viral CRC value; and
   determine whether the computer readable code has malicious code by determining whether the another CRC value is present in a database of second viral CRC values used for determining whether the computer readable code has malicious code, each second viral CRC value including corresponding instructions specific to the each second viral CRC value for how to proceed if it is determined that the computer readable code has malicious code.

8. A recording medium as recited in claim 7, wherein the corresponding instructions associated with the matching first viral CRC value comprise virus-specific instructions indicating how to proceed when malicious code associated with a particular-type of virus is potentially detected.

9. The recording medium of claim 7, wherein it is determined that the computer readable code has malicious code if the another CRC value matches a second viral CRC value in the database of second viral CRC values.

10. The recording medium of claim 7, wherein the another portion comprises a constant portion of the computer readable code.

11. The recording medium of claim 7, wherein the another portion is larger than the first portion.

12. A programmed computer apparatus comprising a memory encoded with executable code for detecting malicious code in computer readable code, the apparatus when executing the executable code configured to perform a method comprising:
  determining a Cyclic Redundancy Check (CRC) value of a first portion of the computer readable code;
  performing an initial determination to determine whether the computer readable code potentially has malicious code by determining whether the CRC value of the first portion of the computer readable code is present in a database of first viral CRC values used for determining whether the computer readable code potentially has malicious code, each first viral CRC value including corresponding instructions specific to the each first viral CRC value for how to proceed if it is determined that the computer readable code potentially has malicious code; and
  if it is determined that the CRC value of the first portion of the computer readable code matches a first viral CRC value present in the database of first viral CRC values:
  determining another CRC value of another portion of the computer readable code as indicated by the corresponding instructions associated with the matching first viral CRC value; and
  determining whether the computer readable code has malicious code by determining whether the another CRC value is present in a database of second viral CRC values used for determining whether the computer readable code has malicious code, each second viral CRC value including corresponding instructions specific to the each second viral CRC value for how to proceed if it is determined that the computer readable code has malicious code.

13. A programmed computer apparatus as recited in claim 12, wherein the corresponding instructions associated with the matching first viral CRC value comprise virus-specific instructions indicating how to proceed when malicious code associated with a particular-type of virus is potentially detected.

14. The programmed computer apparatus of claim 12, wherein it is determined that the computer readable code has malicious code if the another CRC value matches a second viral CRC value in the database of second viral CRC values.

15. The programmed computer apparatus of claim 12, wherein the another portion comprises a constant portion of the computer readable code.

16. The programmed computer apparatus of claim 12, wherein the another portion is larger than the first portion.

17. A method of detecting malicious code in computer readable code, comprising:
  determining a first Cyclic Redundancy Check (CRC) value of a first portion of a file containing computer readable code;
  providing a first viral CRC value derived from a first portion of a reference file that has been corrupted with malicious code wherein the first portion of the reference file corresponds to the first portion of the file;
  performing an initial determination to determine whether the first portion of the file indicates that the computer readable code may potentially have malicious code by comparing the first CRC value with the first viral CRC value wherein it is determined that the computer readable code potentially has malicious code if the first CRC value matches the first viral CRC value;
  if it is determine from the initial determination that the computer readable code potentially has malicious code:
  determining a second CRC value of a second portion of the file wherein the first viral CRC value indicates the second portion of the file from which the second CRC value is determined;
  providing a second viral CRC value derived from a second portion of the reference file wherein the second portion of the reference file corresponds to the second portion of the file; and
  performing another determination to determine whether the computer readable code has malicious code by comparing the second CRC value with the second viral CRC value; and wherein:
  the first viral CRC value includes a first set of corresponding instructions specific to the first viral CRC value for how to proceed if it is determined that the computer readable code potentially has malicious code; and
  the second viral CRC value includes a second set of corresponding instructions specific to the second viral CRC value for how to proceed if it is determined that the computer readable code has malicious code.

18. A method as recited in claim 17, wherein it is determined that the computer readable code has malicious code if the second CRC value matches the second viral CRC value.

19. A method as recited in claim 17, wherein the second portion of the file comprises a constant portion of the file.

20. A method as recited in claim 17, wherein the second portion of the file is larger than the first portion.

21. A method as recited in claim 17, wherein first portion of the file is a header of the file and the first portion of the reference file is a header of the reference file; and
  the second portion of the file is a body of the file and the second portion of the reference file is a body of the reference file.

22. A method as recited in claim 17, wherein the reference file is derived from the file.

23. A method as recited in claim 17, wherein the second set of corresponding instructions comprise virus-specific instructions indicating how to proceed when malicious code associated with a particular-type of virus is detected.

24. The method of claim 17, wherein the second viral CRC value is selected from a plurality of viral CRC values corresponding to the first viral CRC value.

25. A recording medium encoded with executable code for detecting malicious code in computer readable code, the executable code comprising code configured to:
  determine a first Cyclic Redundancy Check (CRC) value of a first portion of a file containing computer readable code;
  provide a first viral CRC value derived from a first portion of a reference file that has been corrupted with malicious code wherein the first portion of the reference file corresponds to the first portion of the file;
  perform an initial determination to determine whether the first portion of the file indicates that the computer readable code may potentially have malicious code by comparing the first CRC value with the first viral CRC value wherein it is determine that the computer readable code potentially has malicious code if the first CRC value matches the first viral CRC value;
  if it is determined from the initial determination that the computer readable code potentially has malicious code:

determine a second CRC value of a second portion of the file wherein the first viral CRC value indicates the second portion of the file from which the second CRC value is determined;

provide a second viral CRC value derived from a second portion of the reference file wherein the second portion of the reference file corresponds to the second portion of the file; and perform another determination to determine whether the computer readable code has malicious code by comparing the second CRC value with the second viral CRC value and wherein:

the first viral CRC value includes a first set of corresponding instructions specific to the first viral CRC value for how to proceed if it is determined that the computer readable code potentially has malicious code; and the second viral CRC value includes a second set of corresponding instructions specific to the second viral CRC value for how to proceed if it is determined that the computer readable code has malicious code.

26. A recording medium as recited in claim 25, wherein it is determined that the computer readable code has malicious code if the second CRC value matches the second viral CRC value.

27. A recording medium as recited in claim 25, wherein the second portion of the file comprises a constant portion of the file.

28. A recording medium as recited in claim 25, wherein the second portion of the file is larger than the first portion.

29. A recording medium as recited in claim 25, wherein first portion of the file is a header of the file and the first portion of the reference file is a header of the reference file; and the second portion of the file is a body of the file and the second portion of the reference file is a body of the reference file.

30. A recording medium as recited in claim 25, wherein the reference file is derived from the file.

31. A recording medium as recited in claim 25, wherein the second set of corresponding instructions comprise virus-specific instructions indicating how to proceed when malicious code associated with a particular-type of virus is detected.

32. A programmed computer apparatus comprising a memory encoded with executable code for detecting malicious code in computer readable code, the apparatus when executing the executable code configured to perform a method comprising:

determining a first Cyclic Redundancy Check (CRC) value of a first portion of a file containing computer readable code;

providing a first viral CRC value derived from a first portion of a reference file that has been corrupted with malicious code wherein the first portion of the reference file corresponds to the first portion of the file;

performing an initial determination to determine whether the first portion of the file indicates that the computer readable code may potentially have malicious code by comparing the first CRC value with the first viral CRC value wherein it is determined that the computer readable code potentially has malicious code if the first CRC value matches the first viral CRC value;

if it is determined from the initial determination that the computer readable code potentially has malicious code:

determining a second CRC value of a second portion of the file wherein the first viral CRC value indicates the second portion of the file from which the second CRC value is determined;

providing a second viral CRC value derived from a second portion of the reference file wherein the second portion of the reference file corresponds to the second portion of the file; and performing another determination to determine whether the computer readable code has malicious code by comparing the second CRC value with the second viral CRC value and wherein:

the first viral CRC value includes a first set of corresponding instructions specific to the first viral CRC value for how to proceed if it is determined that the computer readable code potentially has malicious code; and the second viral CRC value includes a second set of corresponding instructions specific to the second viral CRC value for how to proceed if it is determined that the computer readable code has malicious code.

33. A programmed computer apparatus as recited in claim 32, wherein it is determined that the computer readable code has malicious code if the second CRC value matches the second viral CRC value.

34. A programmed computer apparatus as recited in claim 32, wherein the second portion of the file comprises a constant portion of the file.

35. A programmed computer apparatus as recited in claim 32, wherein the second portion of the file is larger than the first portion.

36. A programmed computer apparatus as recited in claim 32, wherein first portion of the file is a header of the file and the first portion of the reference file is a header of the reference file; and the second portion of the file is a body of the file and the second portion of the reference file is a body of the reference file.

37. A programmed computer apparatus as recited in claim 32, wherein the reference file is derived from the file.

38. A programmed computer apparatus as recited in claim 32, wherein the second set of corresponding instructions comprise virus-specific instructions indicating how to proceed when malicious code associated with a particular-type of virus is detected.

* * * * *